(12) United States Patent
Chen et al.

(10) Patent No.: US 8,570,994 B2
(45) Date of Patent: Oct. 29, 2013

(54) SYSTEMS AND METHODS FOR MULTI-BEAM OPTIC-WIRELESS VEHICLE COMMUNICATIONS

(75) Inventors: Wai Chen, Basking Ridge, NJ (US); John Lee, Howell, NJ (US); Ratul K. Guha, Kendall Park, NJ (US); Ryokichi Onishi, Jersey City, NJ (US); Rama Vuyyuru, Somerset, NJ (US)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 0 days.

(21) Appl. No.: 13/276,375

(22) Filed: Oct. 19, 2011

(65) Prior Publication Data

US 2012/0093015 A1 Apr. 19, 2012

Related U.S. Application Data

(63) Continuation of application No. 12/178,338, filed on Jul. 23, 2008, now Pat. No. 8,068,463.

(51) Int. Cl.
*H04W 4/00* (2009.01)
(52) U.S. Cl.
USPC .......................................................... 370/338
(58) Field of Classification Search
None
See application file for complete search history.

(56) References Cited

U.S. PATENT DOCUMENTS

| | | |
|---|---|---|
| 7,813,326 B1 | 10/2010 | Kelm et al. |
| 2003/0134598 A1 | 7/2003 | Sendrowicz |
| 2004/0230345 A1 | 11/2004 | Tzamaloukas |
| 2004/0246940 A1 | 12/2004 | Kubler et al. |
| 2005/0063356 A1 | 3/2005 | Larsen et al. |
| 2006/0133289 A1 | 6/2006 | Golle et al. |
| 2006/0203804 A1 | 9/2006 | Whitmore et al. |
| 2006/0215581 A1* | 9/2006 | Castagnoli ..................... 370/254 |
| 2006/0221891 A1 | 10/2006 | Schmitz et al. |
| 2007/0013548 A1 | 1/2007 | Sendrowicz |
| 2008/0247335 A1* | 10/2008 | Rudnick ........................ 370/256 |
| 2009/0003216 A1* | 1/2009 | Radunovic et al. ........... 370/237 |
| 2009/0201860 A1* | 8/2009 | Sherman et al. .............. 370/329 |

OTHER PUBLICATIONS

International Search Report, dated Nov. 3, 2008.

* cited by examiner

*Primary Examiner* — Anh-Vu Ly
(74) *Attorney, Agent, or Firm* — Philips J. Feig

(57) ABSTRACT

The present invention offers systems and methods for effective multiple-hop routing, multicasting and media access control for vehicle group communications that employ directional wireless radio technology. Multi-beam optic-wireless media and streamlined operations provide low-overhead communications among vehicles. Systems and methods are provided to maintain a quasi-stationary group of neighboring vehicles, enable high-throughput on-demand switching among multiple vehicles, enable group coding in the vehicle group to achieve higher throughput, and enable dynamic adjustment of link to maintain desirable vehicle group. The proposed solution builds upon the conception of a MAC-free wireless operation and quasi-stationary vehicular switched network to achieve ultra-low-overhead and high-throughput vehicle communications.

13 Claims, 14 Drawing Sheets

LINK CONNECTIVITY

1405

LINKS BEING USED FOR PACKET FORWARDING FROM VEHICLE e

*ACK FLOW IS NOT INDICATED

SYSTEMS AND METHODS FOR MULTI-BEAM OPTIC-WIRELESS VEHICLE COMMUNICATIONS

CROSS-REFERENCE TO RELATED APPLICATIONS

This application is a continuation of pending U.S. patent application Ser. No. 12/178,338, filed Jul. 23, 2008. This application claims the benefit of Provisional Application No. 60/961,626, entitled "ARCHITECTURE AND TECHNOLOGY FOR MULTI-BEAM OPTIC-WIRELESS VEHICLE COMMUNICATIONS", filed in the United States Patent and Trademark Office on Jul. 23, 2007. The disclosure of said Provisional Application is incorporated herein by reference.

The present invention is also related to commonly owned, co-pending U.S. patent application Ser. No. 11/585,047 filed Oct. 23, 2006 entitled Method and Communication Device for Routing Unicast and Multicast Messages in an Ad-hoc Wireless Network (the "'047 Application"). The disclosure of said Application is incorporated herein by reference.

FIELD OF THE INVENTION

The present invention relates to a communication network in a mobile environment. More specifically, the invention relates to multi-beam optic-wireless communication between vehicles in a multi-hop peer-to-peer Vehicular Ad-hoc Network (VANET).

BACKGROUND

Wireless communication has become common in all aspects of life today, whether it be a wireless home or office network, so-called "hotspot" networks at local cafes, fast food chains or hotels, or even citywide implementations of WiFi and other technologies. This desire to become a society of wireless communication has even extended to moving devices such as a moving vehicle. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 milli-seconds) and sustained throughput (or equivalently, the percentage of neighboring vehicles that successfully receive warning messages) in order to support various VSC applications such as collision avoidance. The '047 Application describes a method for organizing groups of moving vehicles into a Local Peer Group (LPG) by selecting one moving vehicle as a group header, maintaining the LPG using the group header, and generating local routing information. The LPG is formed by transmission of control messages such as heartbeats (HB) and membership reports (MR). The HB message has been implemented using flooding mechanisms. The moving vehicles are adapted for unicast and multicast routing.

However, packet distribution is a major overhead of LPG-based routing protocols including the unicast and multicast protocols. In situations where the number of neighbor nodes is large, such as in a traffic jam, duplicate packets significantly add to this overhead. Further, random contention among nodes induces considerable back-off time and then degrades link throughput, while there is high complexity of network coding in typical mobile ad-hoc networks. Accordingly, there is a need for efficient packet distribution.

SUMMARY OF THE INVENTION

The present invention offers systems and methods for effective multiple-hop routing, multicasting and media access control for vehicle group communications that employ directional wireless radio technology. Multi-beam optic-wireless media provide low-overhead communications among vehicles. Systems and methods are provided to maintain a quasi-stationary group of neighboring vehicles, enable high-throughput on-demand switching among multiple vehicles and enable group coding amongst vehicles to achieve higher throughput. The proposed solution builds upon the conception of a MAC-free wireless operation and quasi-stationary vehicular switched network to achieve ultra-low-overhead and high-throughput vehicle communications.

According to one exemplary embodiment, the present invention is a vehicular ad-hoc network (VANET), comprising a first vehicle having a plurality of antennas, a first neighbor vehicle that transmits a data packet that is received by said first vehicle via a first antenna out of the plurality of antennas, a second neighbor vehicle to receive said data packet send by said first vehicle via a second antenna out of the plurality of antennas, wherein said first vehicle further comprises a switching unit to transfer the data packet between said first and second antennas.

Communication between an antenna of a neighbor vehicle and an antenna out of the plurality of antennas of the first vehicle further comprises at least one directional radio link, and the data packet further comprises metadata including an antenna ID, neighbor vehicle ID, initial location, hop count, sequence number, application attributes, and related information.

The embodiment further comprises a logic unit to generate a link table for each antenna of said plurality of antennas on the first vehicle, said link table including records for each neighbor vehicle within communication range of said each antenna, and at least attributes such as bandwidth and link lifetime for each directional radio link with said each neighbor vehicle. The link table for each antenna is updated at a frequency that is a function of the speed of the first vehicle, and wherein records for neighbor vehicles that are not updated are purged after a set time.

In one embodiment, the first vehicle maintains a neighbor table comprising records for each directional radio link, said records including information about each antenna and the vehicle ID of the neighbor communicating over the directional radio link. The records can also accommodate other information pertaining to the link such as a MAC address and IP address of the antenna and the neighbor vehicle.

In a related embodiment, the switching unit generates a Switched Packet List (SPL), said SPL comprising a source ID, sequence number for the data packet, acknowledgement status, and a cached copy of the data packet. The switching unit discards an incoming data packet if a record for said incoming data packet exists in the SPL.

In a related embodiment, a switching table maintains the outgoing links for every incoming link. The transmitting antennas comprise a subset of the plurality of antennas. The switching table comprises a source field, incoming field, and outgoing field, wherein the source is the root of the corresponding source spanning tree and incoming and outgoing fields are obtained based on the outgoing links in the corresponding source spanning tree.

In a related embodiment, the first vehicle forwards the data packet only to selected neighbors. A Neighboring Information Table (NIT) comprises neighbors for the first vehicle and associated active links for each neighbor and neighbors for each neighbor. A switching table showing status of incoming and outgoing direct radio links between the first vehicle and the plurality of neighbor vehicles, wherein the outgoing radio links are determined based on a comparison of immediate neighbors of the first vehicle and immediate neighbors of the neighbor vehicle.

In another embodiment, a group coding manager is configured to perform the following operations: splitting the data packet into a plurality of blocks, randomly selecting coefficients from a finite field, taking a linear combination of the blocks with said coefficients, and embedding the coefficients in the data packet to form a coded block. The coded block is transmitted via a plurality of intermediate vehicles to a destination vehicle whereupon the coded block is decoded through a matrix inversion operation in a finite field.

In another embodiment, the present invention is a method for transmitting a data packet across a Vehicular Ad-hoc Network (VANET) having a plurality of vehicles, each of which having a plurality of directional antennas, the method comprising receiving at a first vehicle a data packet from a first neighbor vehicle via an incoming directional radio link from one of the plurality of directional antennas, checking if the data packet is a duplicate data packet, transferring the data packet to a second antenna of the plurality of antennas, and forwarding the data packet to a neighbor vehicle via a second outgoing radio link from said second antenna of the plurality of antennas. The data packet further comprises a header including a Source ID, Sequence Number, and Recipient Information for the data packet, the method further comprising generating a Switched Packet List (SPL), said SPL including the source ID, sequence number, acknowledgement status, and packet cache for each data packet, determining a source and a scope of the data packet, and adding the data packet to the SPL.

The scope of the data packet includes the time-to-live of the packet, or the maximum hop count of the data packet, the method further comprising discarding the data packet if the scope of the data packet is exceeded. The method further comprises discarding the data packet if it is determined that the packet cache for the data packet already exists in the SPL. The method further comprises awaiting for an acknowledgement from each of the plurality of neighbor vehicles via the plurality of outgoing radio links, retransmitting the data packet if said acknowledgement is not received, and recording the acknowledgement status in the SPL when acknowledgement is received. The method further comprises discarding the data packet from an incoming link if acknowledgement has already been received.

In a related embodiment, the method further comprises generating a switching table based on status of all direct radio links between vehicles in the network. The switching table comprises a source field, incoming field, and outgoing field, wherein the source is the root of the corresponding source spanning tree and incoming and outgoing links are obtained from the corresponding source spanning tree.

In a related embodiment, the method further comprises forwarding the data packet only to selected neighbors. A Neighboring Information Table (NIT) comprising immediate neighbors for the first vehicle and associated active links for each immediate neighbor and neighbors of each immediate neighbor. The method further comprises generating a Switching Table showing status of incoming and outgoing direct radio links between the first vehicle and the plurality of neighbor vehicles, wherein the outgoing radio links are determined based on a comparison of the NIT of the first vehicle and the NIT of the neighbor vehicle. The method further comprises receiving a packet from a neighboring vehicle, receiving the NIT of said neighboring vehicle via the direct radio link between the first vehicle and the neighboring vehicle, comparing said NIT of the neighboring vehicle with the first vehicle's own NIT, and forwarding the packet only to the neighbors of the first vehicle that are not present on the NIT of the neighboring vehicle.

The method further comprises splitting the data packet into a plurality of blocks, randomly selecting coefficients from a finite field, taking a linear combination of the blocks with said coefficients, and embedding the coefficients in the data packet to form a coded block. The coded blocks are transmitted to a neighbor vehicle, and decoded at the neighbor vehicle through a matrix inversion operation in a finite field.

The method further comprises encoding blocks of a data packet at the first vehicle to form group coded data packet, accumulating and relaying said group coded data packet at an intermediate vehicle, and accumulating and decoding the group coded data packet at a destination vehicle.

DETAILED DESCRIPTION OF THE INVENTION

The present invention provides systems and methods to achieve ultra-high throughput in multi-hop VANETs with directional radio links with immediate neighboring vehicles, or "neighbors."

Neighbor Links

Figure 1:
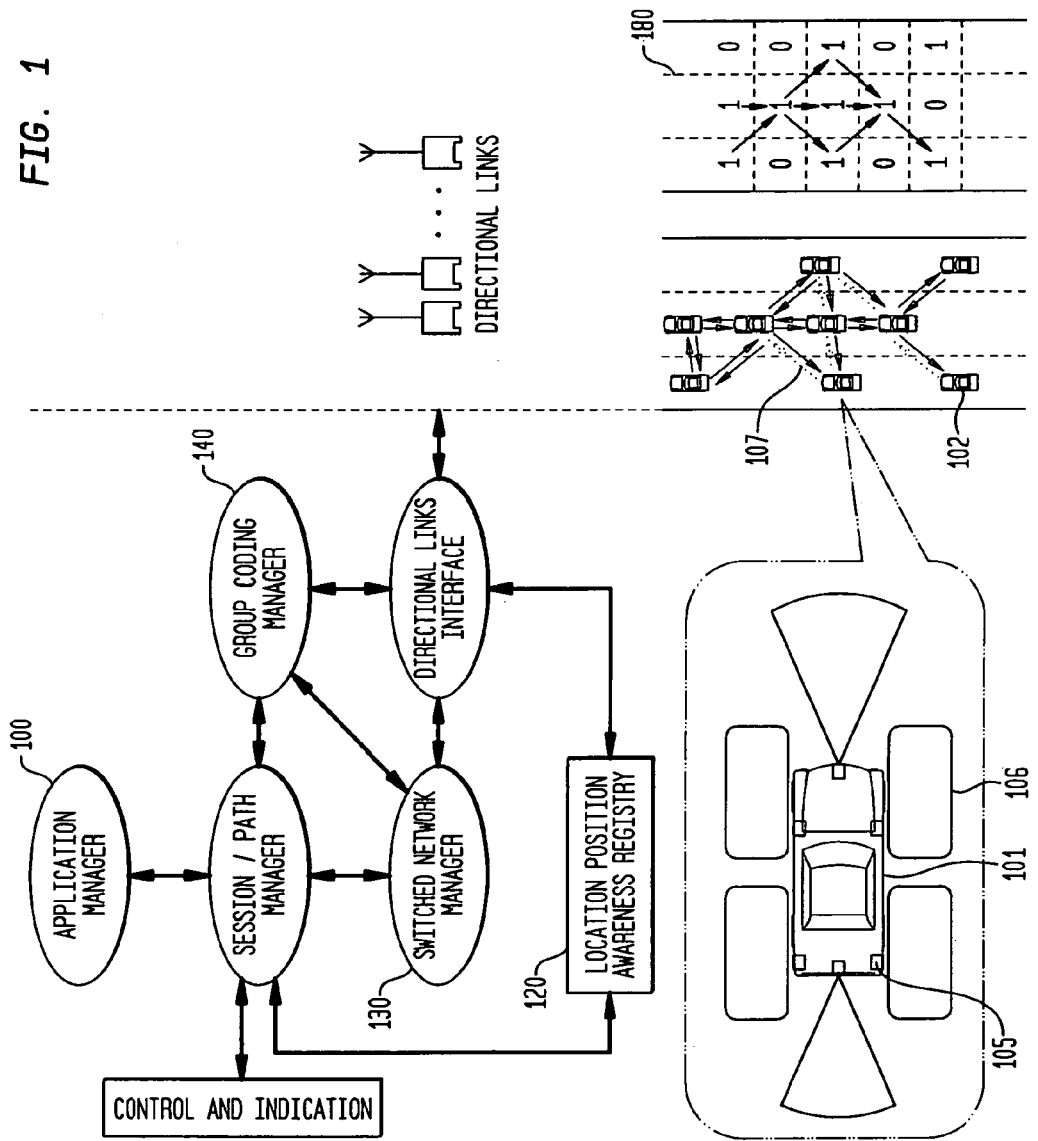
FIG. 1 illustrates the architecture of a system according to an exemplary embodiment of the present invention.

FIG. 1 shows the architecture of the system according to an exemplary embodiment of the present invention. A vehicle 101 has multiple antennas 105. Each antenna 105 is directional and as such focuses its energy only on a limited region 106. The antennas 105 can form 'directional links' 107 with antennas of neighbors 102. Directional links 107 operate without interfering with other directional links and as such eliminate the need for a contention resolution protocol. The system involves leveraging this contention-free architecture to provide a simple protocol for vehicular communication. Owing to multiple antennas, multiple simultaneous links 107 can be established with neighboring vehicles 102.

The presence of surrounding vehicles is managed through a location/position awareness registry 120 within the vehicle. The creation of this location registry is described in more detail below. Data can be disseminated in a multi-hop fashion. In this context, each vehicle acts as a switching element in a grid of switches 180. The function of the switched-network manager 130 is to receive incoming data from a subset of its radios and transmit it to another subset of the radios within each vehicle. In the process of switching, the data could be relayed, replicated or even coded at the switching element (within the vehicle). Extending the idea, coding can be carried out across a group of vehicles and is referred to as group coding 140. Sessions and paths can be realized in this network through appropriate switching schemes at different vehicles. The sessions and the paths themselves depend upon the requirements of the application.

The provision of a plurality of antennas 105 that are uni-directional serves to minimize interference, unlike omni-directional antennas. "MAC-free" access ensures there is no random contention among nodes to access wireless medium (nodes have "dedicated" links). High & sustainable multi-hop throughput includes bandwidths of, for instance, 50~500 Mbps. A single hop is typically about 30 m so that it likely reaches only immediate neighbors ("neighbors"). Further, the low-complexity network ensures fast, switched connections among vehicles, enabling a quasi-stationary switched-network among neighboring vehicles.

Figure 2:
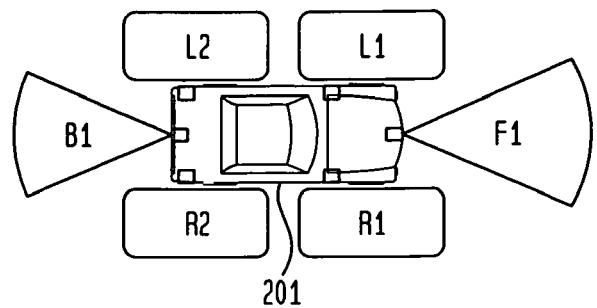
FIG. 2 shows a vehicle equipped with several directional antennas, according to an exemplary embodiment of the present invention.

FIG. 2 shows a vehicle equipped with several directional antennas, according to an exemplary embodiment of the present invention. The antennas are named according to the position on the vehicle. The antennas at the front can be numbered as F1, F2 etc. The antennas at the back of the vehicle are numbered as B1, B2 etc. The antennas on the left and the right side can be numbered as L1, L2, L3 and R1, R2, R3 etc respectively.

Hereinafter, the term 'radio' refers to the entire communicating device while the term antenna refers to the portion of the radio that transmits electromagnetic energy. According to an embodiment of the present invention, each vehicle has N antennas that can provide directional links. Each radio has the capability to detect and form a directional link with another radio in the range. Each directional link is one-way; a bi-directional (full duplex) link needs two directional (one-way) links. Each directional link will not have radio interference with another directional link. Each radio knows the status of directional link status, i.e. whether a directional link exists with another radio; and if a link exists, the radio knows the meta-data of the link (corresponding antenna ID, neighbor vehicle ID, initial location, and other info, etc.) Existing directional links between two radios will break due to fading in wireless propagation or vehicle distance change; and the two radios will be aware of the directional link break.

For each radio in a vehicle, a table is maintained that lists the other radios that it can communicate with. The table has the ID of the neighboring vehicle, and other link attributes such as name of the radio (Fx, By . . . ), the power level, supported rates etc

TABLE 1

Radio Links Detected

| Vehicle ID | Link Attributes |
|---|---|
| $V_x$ | |
| $V_y$ | |
| $V_z$ | |

Each vehicle maintains such a table for all its radios. This information provides the possible choices for link establishment. Link attributes may include power level, supported transfer rates, estimated link duration, and other factors that may depend on the physical layer. The information is updated in a timely manner that might be dependent on vehicle speeds. Readings that are not updated are deemed stale and purged after an appropriate time.

Figure 3:
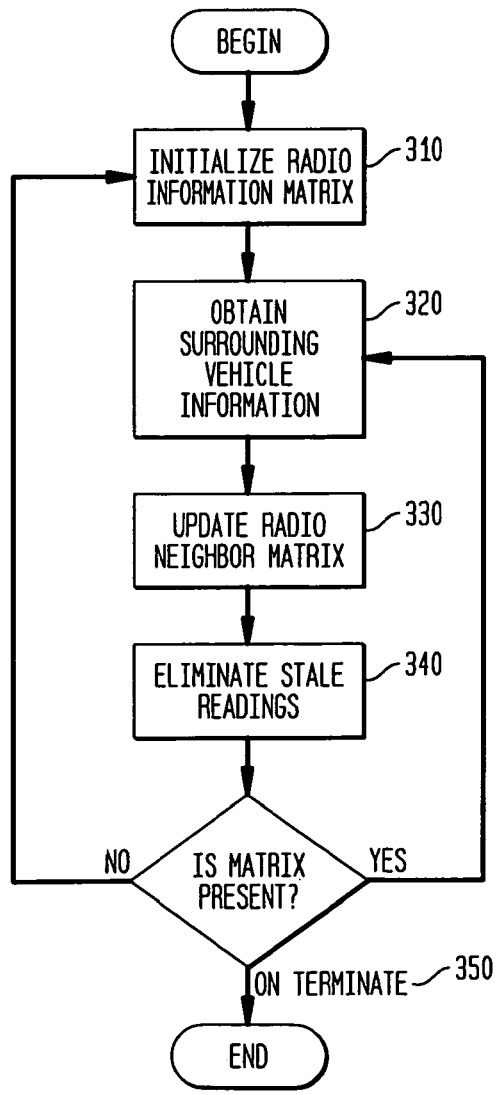
FIG. 3 is a flowchart showing the process for updating the detected links table, according to an exemplary embodiment of the present invention.

FIG. 3 is a flowchart showing the process for updating the detected links table, according to an exemplary embodiment of the present invention. Once the radio information matrix is initialized (310), for instance upon starting the vehicle, radio contact is detected (320) from surrounding vehicles (neighbors). Each neighboring radio vehicle ID and link attributes are updated (330) in the neighbor matrix. Stale readings are eliminated (340) and the process is repeated until terminated, for instance, if the vehicle is turned off. (350).

Based on the link detection information discussed previously, connections are formed based on various factors and maintained in a table, see Table 2 below. The decision whether or

TABLE 2

Immediate neighbor information

| Antenna ID | Neighbor ID | Antenna ID | Location | Other info |
|---|---|---|---|---|
| F1 | Vx | B1 | Lx | — |
| R1 | — | — | — | — |
| B1 | Vy | L2 | Ly | — | not to form a link could be based on several factors. For example forming links based on instantaneous best quality would support better transmission reliability. If the link stability is important, then links can be chosen based on the duration for which it is possible to maintain such a link.

There is one such table per vehicle. The table maintains the information about each radio and the ID of the vehicle it is connected to. It also contains the antenna ID for the radio on the neighboring vehicle and its location. Other information pertaining to the link such as the MAC address and the IP address could also be stored. Such information is on a need basis and meant to ensure compatibility with other systems. The present invention does not per se require IP addresses to be assigned to each vehicle in the traditional sense.

Figure 4:
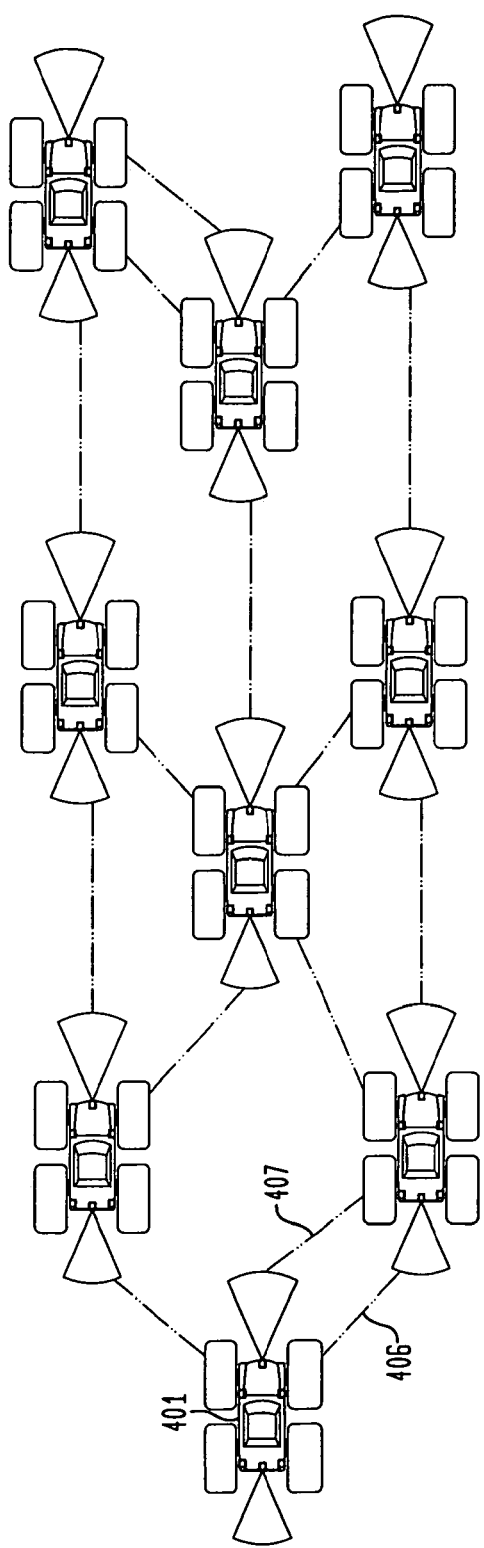
FIG. 4 shows a possible temporary snapshot of vehicle connectivity over multiple hops, according to an exemplary embodiment of the present invention.

FIG. 4 shows a possible temporary snapshot of vehicle connectivity over multiple hops, according to an exemplary embodiment of the present invention. Each vehicle 401 only keeps track of the directional links 406 it forms with its neighboring vehicles as shown in FIG. 1. Further, it is possible to have multiple links 406/407 between two vehicles. As the vehicles move the, distances will change and accordingly links will be broken and re-formed. One of the key objectives to achieve from this system architecture is to rapidly disseminate information in a multi-hop network neighborhood as quickly and reliably as possible.

Broadcasting

This leads to the concept of broadcasting information to a neighborhood. Neighborhood essentially consists of a multiple hop network and the objective is to disseminate information rapidly. One of the key components required to enable neighborhood broadcasting is Intra-vehicle switching. Neighborhood Broadcasting and Intra-Vehicle Switching (NBIVS) is a message dissemination technology for the proposing vehicle-to-vehicle (V2V) network environment where each vehicle has multiple directional radios that are linked with the neighboring vehicles. The concept of NBIVS is to provide a means of disseminating information to all neighborhood vehicles and picking up information as desired. It supports broadcasting, multicasting, and unicasting communications so that any V2V application type associated with these communications can be supported. Information (e.g., safety warning message, emergency message) is diffused to all vehicles in the network and picked up by vehicles interested in the information. Information being transferred within the network consists of both information regarding applications (such as safety warning, emergency, etc) and information regarding recipients. Since setting up communicating paths or groups in VANETS comes at a significant cost, and on path breakage due to mobility, a re-computation is triggered that results in temporary packet drops, the simplest method is to send the information to each vehicle in the network and vehicles pick-up the information that they desire. Such an approach has the potential to significantly outperform conventional unicasting and multicasting in terms of throughput, reliability and recomputation.

According to one exemplary embodiment, a neighborhood broadcast is achieved without a mesh. A mesh refers to a subset of the links of the network. The subset could form a spanning tree, a path or some other structure. The purpose of a mesh is to avoid redundant transmissions however formation of the mesh poses additional overhead. To address this trade-off, neighborhood broadcasting with a mesh is described in a second embodiment. Further, formation of a mesh might require network wide information, whereas certain objectives can be obtained simply by obtaining two-hop neighbor information, i.e., the information from neighbor's neighbor. This is described in the third embodiment.

The above broadcasting embodiments are realized through appropriate intra-vehicular switching. Switching denotes the transfer of packets from one radio or radio subset to other radios/radio subsets within a vehicle. Each of the three embodiments will be presented in detail and corresponding switching schemes will be described.

Figure 5A:
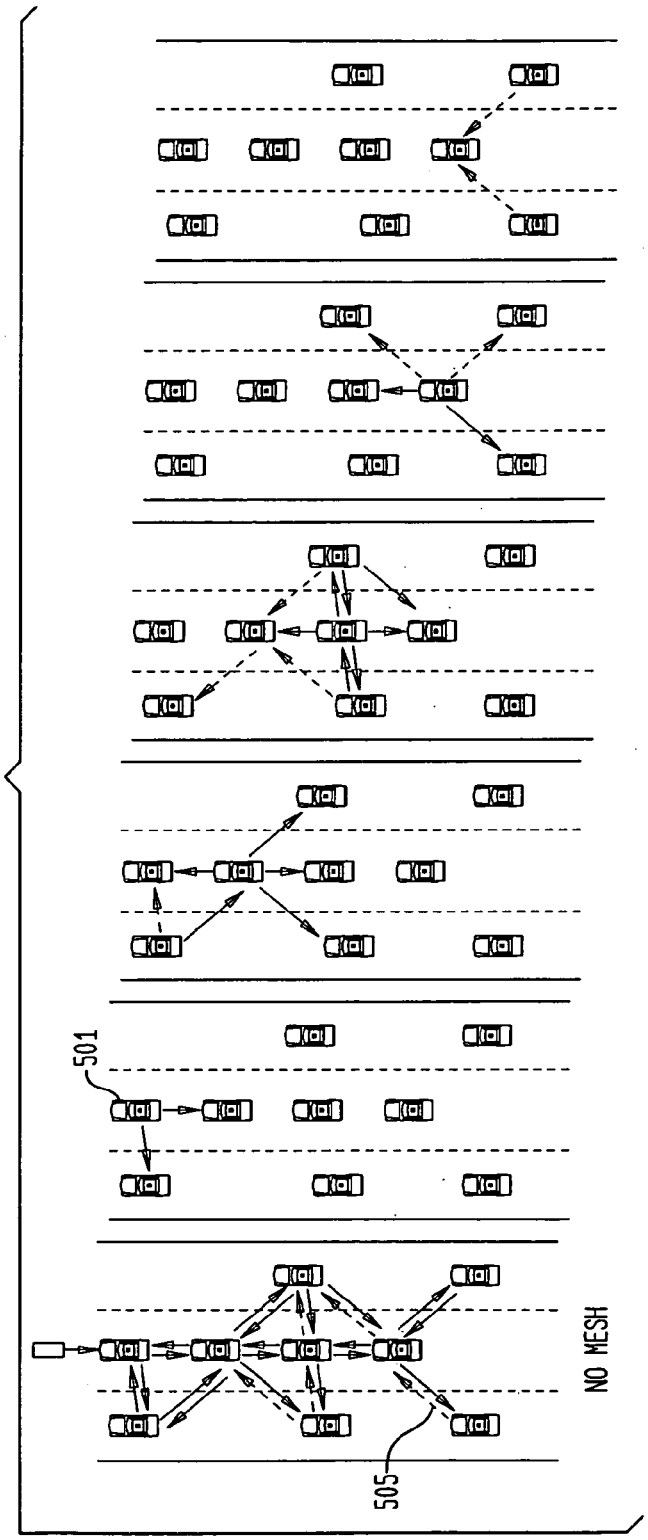
FIGS. 5A and 5B describe a flow operation of an exemplary embodiment of the present invention.
Figure 5B:
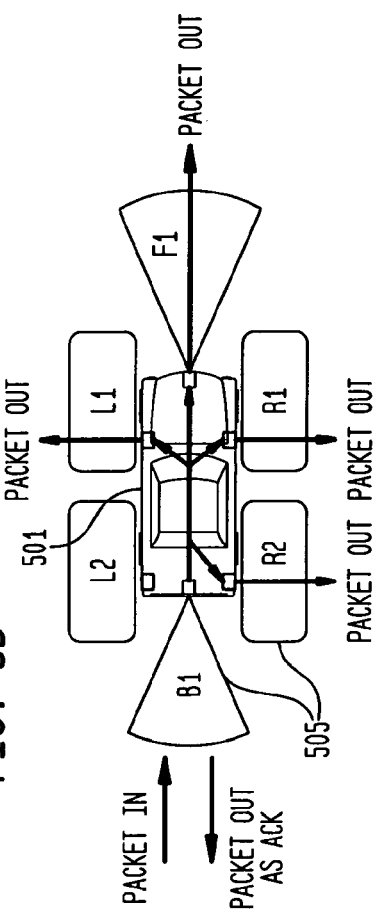

FIGS. 5A and 5B describes the operation of the first exemplary embodiment. Referring to FIG. 5A, each vehicle 501 has multiple directional radios. For the purposes of the present example, we assume that each vehicle has 6 directional radios, however the present invention does cover any legitimate number of radios. Each directional radio can be represented as a radio link 505 to a neighbor. If two vehicles 501 were linked through their directional radios 505, then they consider these directional radios as active links.

Referring to FIG. 5B, in the perspective of a vehicle 501, a packet arrives through one of active links 505 (i.e., incoming link B1) on the vehicle and then leaves through some or all of active links (i.e., outgoing links R1, R2, L1, F1) depending on which forwarding method is used. In the present embodiment, a packet leaves through all active links: As many copies as the number of all active links (including the incoming link) are created.

Referring back to FIG. 5A, each vehicle 501 passes each packet, once, to each of its immediately-linked neighbors. This includes the neighbor where the packet came from, as an acknowledgement or "ACK". However, if two neighbors mutually send each other the same packet, an ACK may not be needed. Each vehicle 501 drops duplicate packets; this process will be further described below. Also, a dissemination scope is enforced, for instance, delivery is stopped when the packet reaches its maximum hop count (HC).

Before switching the packet to the active links, the vehicle must check the packet for a duplicate. In order to eliminate duplicate packets, specific attributes for the packet are defined and specified on a packet header and a table called "Switched Packet List" (SPL) is generated. A packet header consists of three fields; SRC_ID, SEQ_NUM, RECIPIENT_INFO. SRC_ID is filled by the source of a packet (e.g., vehicle ID) and SEQ_NUM represents the sequence number of a packet. This sequence number is specific to the source of packets: the source of packets increments the sequence number for every outgoing packet. RECIPIENT_INFO contains several details such as the scope of a packet, actual recipient(s), application-specific attribute, time-related attribute and more for future. Based on this field, vehicles pick up packets for their own applications. Note that as long as a packet is within its scope, the packet should be relayed. Further, only the source of a packet generates the header for the packet, and the packet header is never changed or updated in transit.

Every vehicle maintains a Switched Packet List (SPL), shown in the below table. A SPL consists of SRC_ID, SEQ_NUM, and ACT_Status, and Packet Cache. The combination of the first two fields makes each packet unique so that duplicates can be determined based on such a combination. ACK_Status is used for packet acknowledgement and Packet_Cache, which keeps actual packets received, is used for retransmission for unacknowledged packets.

TABLE 3

| SRC_ID | SEQ_NUM | ACK_Status | Packet Cache |
|---|---|---|---|
| bbb | 12 | [out1:NO] [out2:NO] [out3:NO] | Pkg_b12 |
| bbb | 11 | [out1:NO] [out2:NO] [out3:YES] | Pkg_b11 |
| aaa | 23 | [out1:YES] [out2:NO] [out3:YES] | Pkg_a23 |
| aaa | 22 | [out1:YES] [out2:YES] [out3:YES] [out4:YES] | Pkg1_a22 |

TABLE 3-continued

| SRC_ID | SEQ_NUM | ACK_Status | Packet Cache |
|--------|---------|------------|--------------|
| aaa | 21 | [out1:YES] [out2:YES] [out3:YES] [out4:YES] | Pkg1_a21 |
| bbb | 10 | [out1:YES] [out2:YES] [out3:YES] [out4:YES] | Pkg_b10 |

Packet acknowledgement is enforced to all three proposed embodiments. In the basic operation of packet acknowledgement, a packet sent out through the link that the packet came through (i.e., incoming link) is used as an ACK for that packet to the neighboring vehicle connected to that link. The baseline system always uses ACK. However, an option is to use ACK per link decision, i.e., if a link is stable, then no ACK is used; but if a link is not stable, then ACK is used. ACK may be piggybacked on another data packet in the reverse direction. The present invention includes the ability to have more than one packet simultaneously traveling in different directions. Further, there is no timer associated with ACK if two nodes linked together are locally synchronized. For example, in t1-slot, A sends a packet to B (A, B are neighbors connected by a link) In t2-slot (next slot), A expects to see an ACK from B for the transmitted packet. If t2-slot doesn't have the ACK, then A re-sends the packet to B in t3-slot. So, no timer is required. This local synchronization is only between the two neighbors on either end of a link. Links themselves are not synchronized, i.e. there may be no global synchronization.

Figure 6:
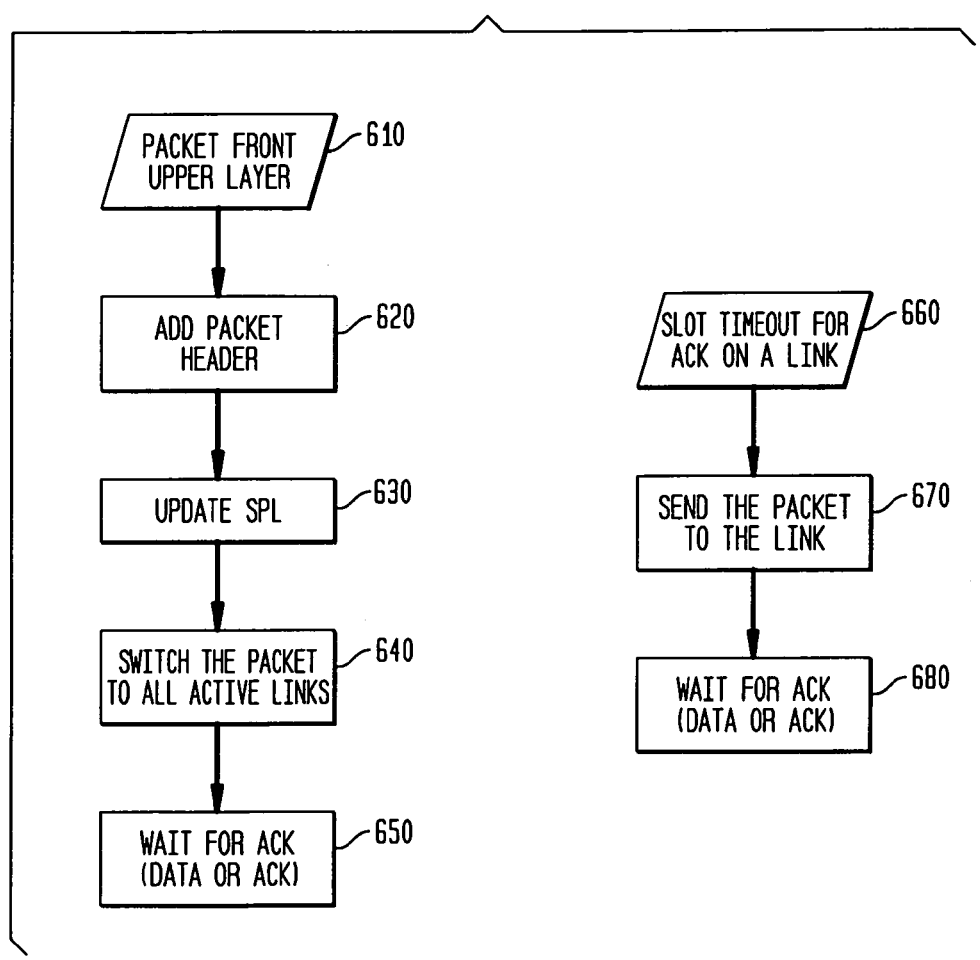
FIG. 6 shows the packet flow diagram for a source at the Switching Layer, according an exemplary embodiment of the present invention.

FIG. 6 shows the packet flow diagram for a source at the Switching Layer, according an exemplary embodiment of the present invention. A packet is passed (610) from a upper layer (e.g., application layer) to below Switching Layer. A packet header is added (620). The information about this packet is added (630) in SPL. Copies of the packet are switched (640) to all active links, and then sent out through all active links. Finally the source waits for ACK (650), or ACK piggybagged in a data packet, for each active link. If a slot time for ACK expires (660) on a link that has been waiting for ACK, a copy of the packet is retransmitted (670) through that link, and waits (680) for ACK again.

Figure 7:
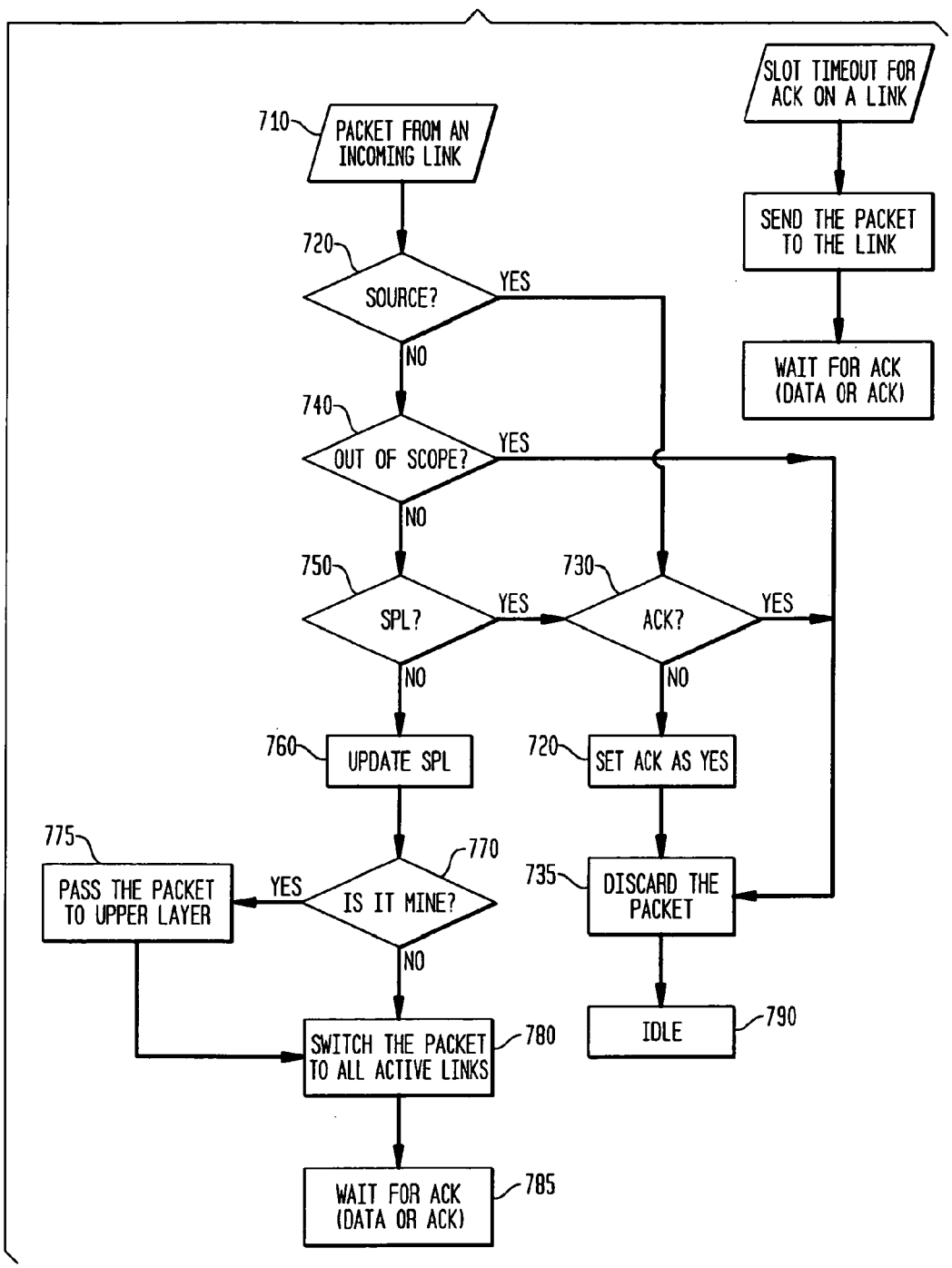
FIG. 7 shows the packet (i.e., in-transit packet) flow diagram for intermediate as well as source vehicles at the Switching Layer, according to an exemplary embodiment of the present invention.

FIG. 7 shows the packet (i.e., in-transit packet) flow diagram for intermediate as well as source vehicles at the Switching Layer, according to an exemplary embodiment of the present invention. A vehicle receives (710) a packet from one of its neighboring vehicles. The switched-network manager checks the packet header to find out if it is the source of the packet (720). If yes, it then checks the SPL (730) to see whether the packet is acknowledged for the incoming link. If the packet were already acknowledged, the packet is discarded (735) and the vehicle stays to the idle state (790).

If this vehicle is not the source of the packet, the switched-network manager checks the recipient information in the packet header to see if the scope of the packet is still valid (740). If the packet is outside of the scope, the packet will be discarded (735) and the vehicle will stay to the idle state (790). Otherwise, it checks the SPL to see if the packet is a duplicate (750). If the packet is new, the SPL of the vehicle is updated (760) with the entry for the packet. If the packet is a duplicate packet, the vehicle will proceed from step 730 as previously described.

Once the SPL is updated, the vehicle checks the destination information in the packet header to see whether it should pick up the packet or not: the packet is destined to this vehicle (770). If the vehicle is one of recipients (or a single recipient) for the packet, it will accept and pass the packet to the upper layer (775), and then move to 780. Otherwise, it directly moves to 780, regardless of the outcome of 770, the vehicle will execute (780). A copy of the packet is switched to each active link and then sent to the neighbor through the link (780). Finally the vehicle waits for ACK (785).

The next embodiment is NBIVS using a mesh. A mesh (or tree) provides connectivity among vehicles in the network so that, if messages flow through the mesh spanning all vehicles, the messages would be delivered to all the vehicles. Having a mesh eliminates redundant packet transmissions. In this embodiment, a mesh is needed and maintained for disseminating messages. Unlike the first embodiment, this requires a Switching Table, the generation of which is further described below.

Figure 8A:
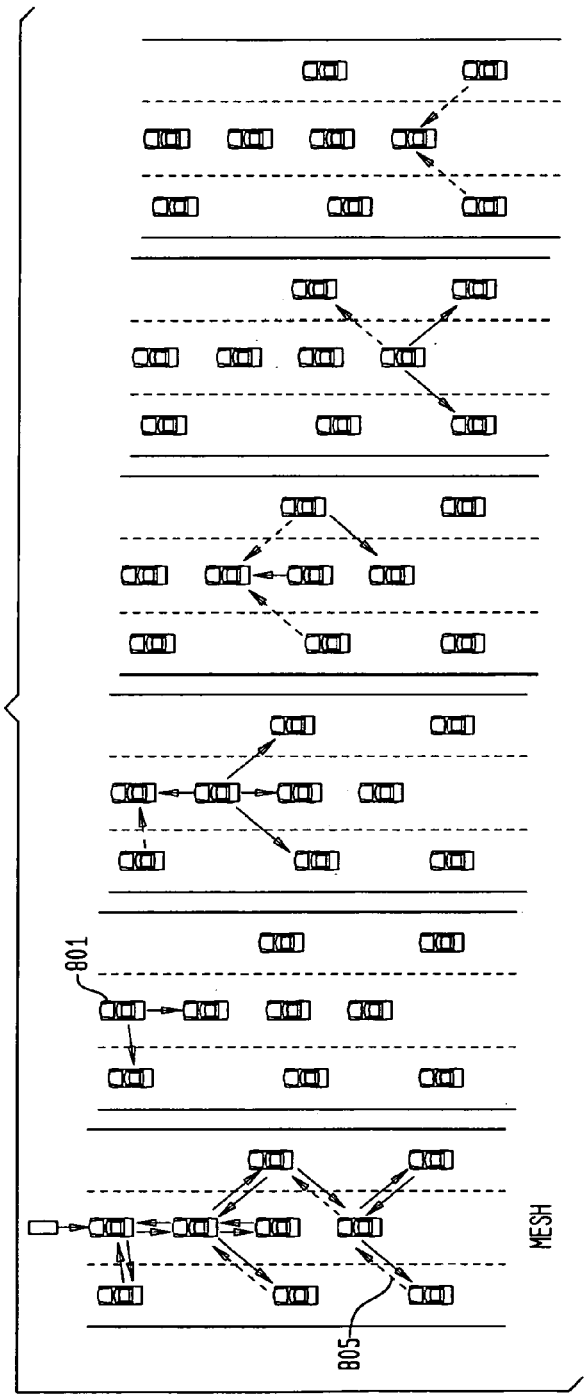
FIGS. 8A and 8B describe a flow operation of a second exemplary embodiment of the present invention.
Figure 8B:
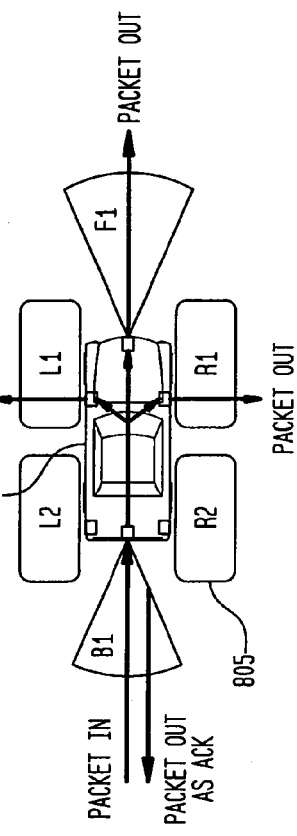

FIGS. 8A and 8B show the establishment of a broadcast mesh for vehicles in the neighborhood. Each vehicle 801 passes each packet, once, to each next-hop neighbor on the "downward" path in the mesh, i.e., along the packet's forwarding direction. This includes forwarding to the neighbor where the packet came from, as ACK. The mesh ensures no duplicated packet, while similar to the above embodiment; a dissemination scope is enforced (e.g., stop at maximum hop count).

FIG. 8B shows switching inside the vehicle 801. An incoming packet is switched to the outgoing links listed in the Switching Table. The Switching Table is generated based on a spanning tree for all vehicles in the network. Every vehicle maintains its Switching Table. Before switching the packet to the outgoing links, the vehicle must check the packet for a duplicate as in the first method. This embodiment uses the same format of a packet header as well as the SPL used in the previous embodiment. Additionally, the same ACK scheme may be used, i.e. a packet sent out through the link on which the packet came through (i.e., incoming link) is used as an ACK for that packet to the neighboring vehicle connected to that link. The baseline system always uses ACK or alternatively, uses ACK per link decision, i.e., if a link is stable, then no ACK is used; but if a link is not stable, then ACK is used. ACK may be piggybacked on another data packet in the reverse direction.

To derive the Switching Table, an L matrix is used.

| 0 | 1 | 0 | 1 | 0 |
|---|---|---|---|---|
| 0 | 0 | 0 | 1 | 0 |
| 0 | 1 | 0 | 0 | 1 |
| 0 | 1 | 0 | 1 | 0 |
| 1 | 0 | 1 | 0 | 0 |

L matrix represents a map for link connectivity among all vehicles in a network. If the number of vehicles in the network is N, the L matrix would be N×N: For each node it, the corresponding uth row denotes the link status with other nodes; i.e., $L_{uv}=1$ if a link exists between nodes u and v; $L_{uv}=0$ otherwise. As convention, $L_{uu}=0$.

This implies that nodes exchange link status information within the neighborhood so that all nodes can update the matrix L. If the link status changes fast, the link status exchange rate should be high; otherwise, the rate is low. The L matrix shows the status of direct connectivity for all possible pairs of vehicles in the network: if a pair of vehicles is directly connected, the value of the status for the link between two vehicles would be "1". Unless, 0 is specified for that link. Every vehicle should have the same L matrix to generate a spanning tree (i.e., connects all vehicles through either a single hop or multiple hops) that is consistent to all vehicles in the network. A status change due to mobility or link failure must be promptly reflected to the L matrix of all vehicles. This is performed in an event-driven fashion if and when the link status changes and does not need any prior setup. For such an urgent update, one can apply the first method (no mesh neighborhood broadcast) to disseminate information about a link change to all vehicles in the network.

The Switching Table is derived from a spanning tree, which in turn is formed by the L matrix as follows. To link all nodes in a network, denote a node and a link as $N_i$ and $L_{ik}$ respectively. Link $L_{ij}$ is a link from node $N_i$ to $N_k$. ANL is an All Node List, where ANL for a network with N nodes is a set of $\{N1, N2, N3, \ldots N_N\}$. LNL=Linked Node List, or a list of linked nodes. OLL=Outgoing Link List, showing links through which packets are forwarded. Thus, $OLL(N_i)$ is the outgoing Link list for $N_i$ as a source; for instance $OLL(N_i)=\{L_{11}, L_{24}, L15, L_{23},\}$. Based on $OLL(N_i)$, each node obtains the incoming and outgoing interfaces for packets from $N_i$.

The procedure is as follows: starting from the first row of the L matrix (i.e., link status list for node $N_1$); $N_i$ would be the root of the spanning tree obtained through this iteration. Include entries (i.e., links) with "1" (say $L_{1j}=1$) into OLL and include the corresponding neighboring nodes into LNL—can be denoted as Func($N_1$). If LNL doesn't include all nodes in the network (i.e., LNL !=ANL), then go to the row corresponding to the first node (say $N_j$) listed in LNL, and do Func(Nj) but do not include nodes and links already listed in LNL and OLL. If LNL !=ANL is still true, go to the row corresponding to the next node (say $N_k$) listed in LNL and repeat Func(Nk). Finally, repeat until LNL=ANL. At this end, a spanning tree for N1 as a root is formed. Obtain the incoming and outgoing interfaces for packets from $N_1$, and repeat for the rests of rows (from 2nd to Nth row). At the end, N spanning trees and N switching entries (for each node as a source) are obtained. Via this procedure, every node has the same set of N spanning trees, ensuring the shortest hop count.

Figure 9A:
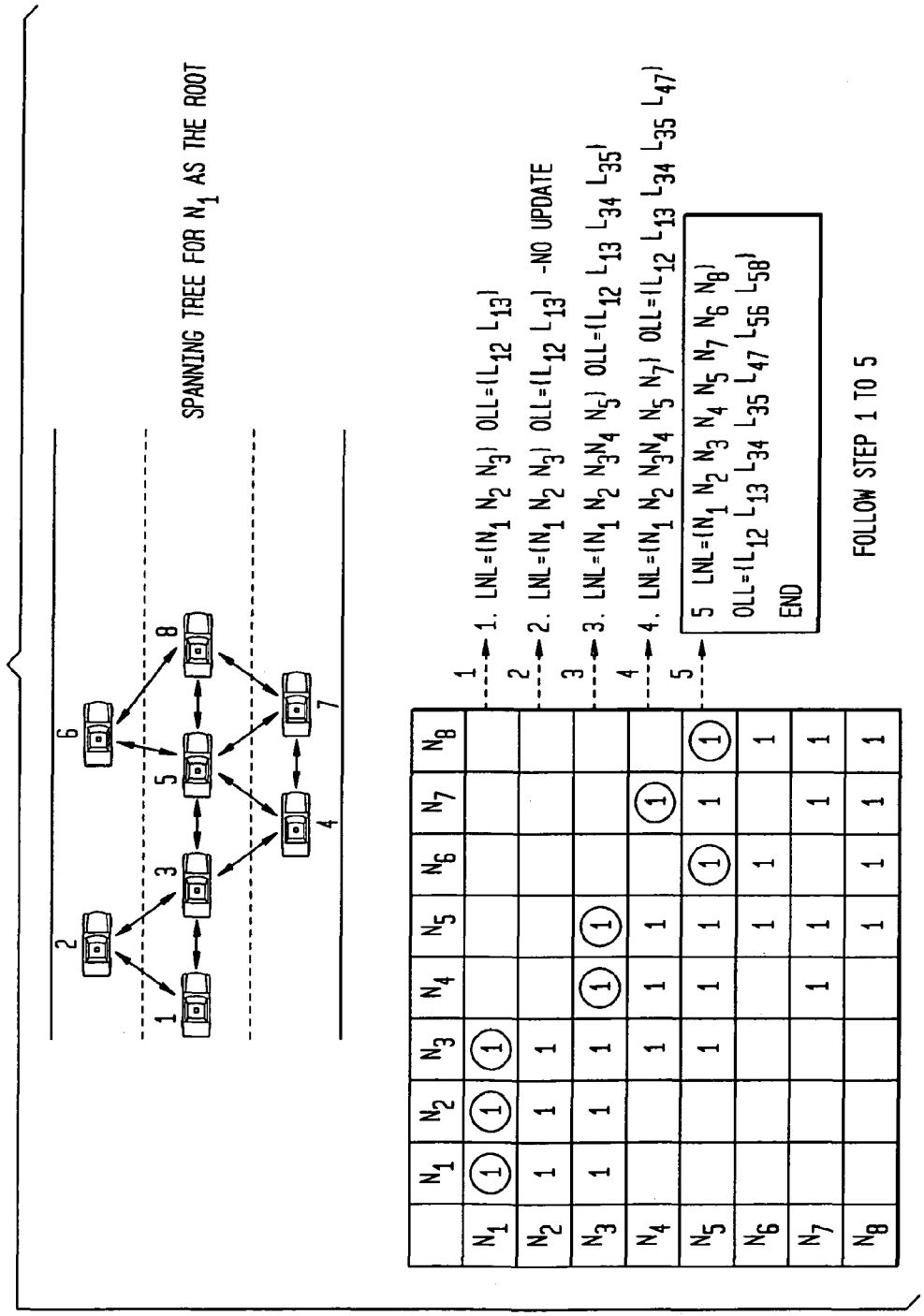
FIGS. 9A and 9B show a method for generating a spanning tree, according to an exemplary embodiments of the present invention.

Refer to FIG. 9A for an example of a spanning tree in which the root is vehicle 1. Since vehicle 1 is represented as the first row in the L matrix, our routine starts from the first row. First LNL includes vehicles 1, 2 and 3. Vehicle 1 connects both vehicle 2 and 3 through $L_{12}$ and $L_{13}$ respectively: $OLL(N_1)$ includes $L_{12}$ and L13. Having done that with the first row, one moves to the next row which pointer can be found in LNL, i.e. the entry next to the one just used for pointing to the previous row. In this case, the second row, pointed by vehicle 2 ($N_2$) is the next row. At the second row, nothing needs to be done since all the vehicles to which vehicle 2 connects have been already included in LNL through the previous iteration. The next row is N3. This time vehicle 4 and 5 (N4 and N5) are included in LNL, and L34 and L35 are included in OLL(N1). Accordingly at the forth row, N7 and L47 is included in LNL and OLL(N1) respectively. At the next row which is pointed by N5, the vehicle 6 and 8 (N6 and N8) and the links L56 and L58 are included in LNL and OLL(N1) respectively. At this point, all the vehicles in the network are included in LNL and they can be connected through the links only listed in OLL (N1). So the iteration for vehicle 1 stops here. Those links listed in OLL(N1) form a spanning tree whose root is vehicle 1.

Figure 9B:
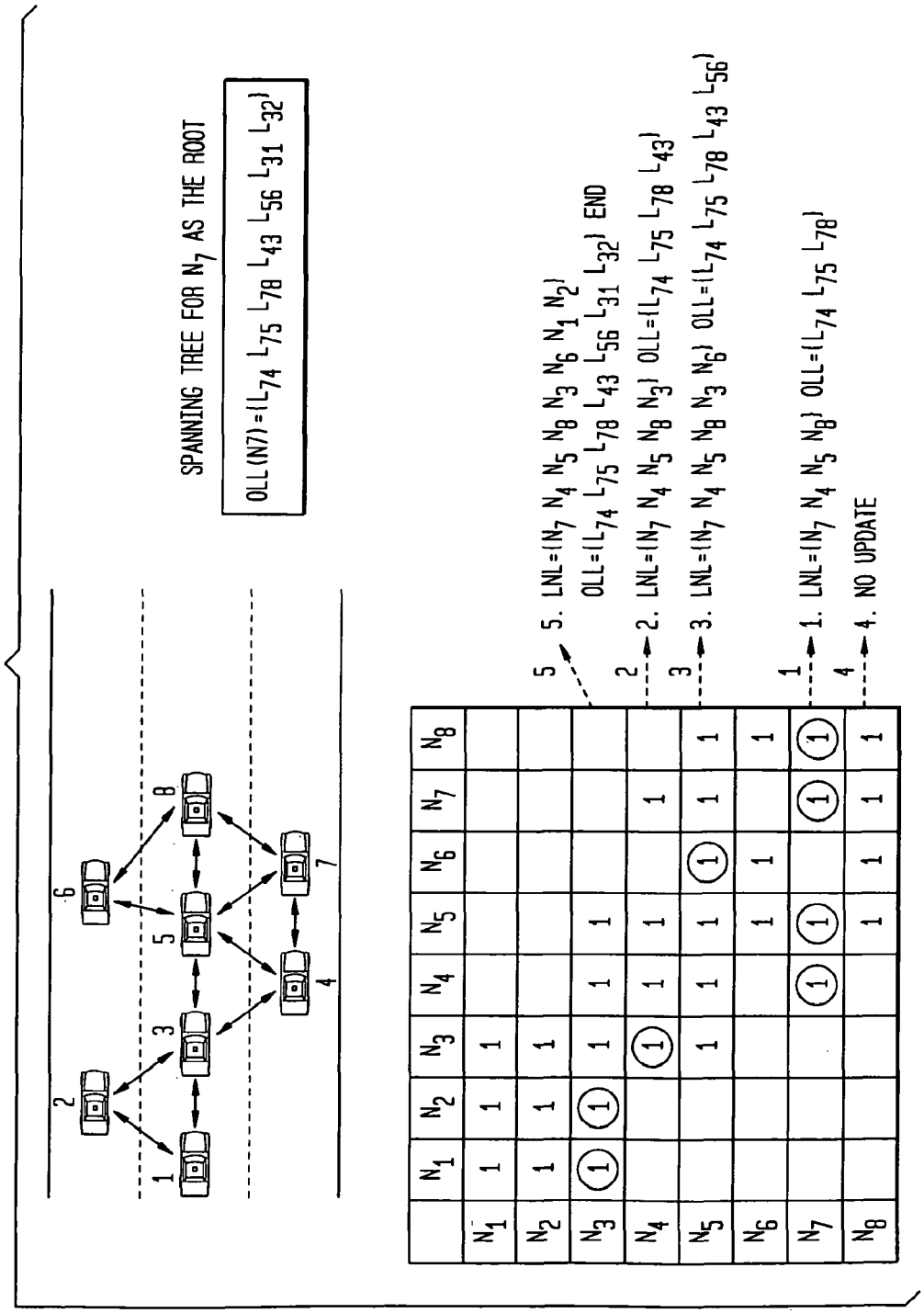

FIG. 9B shows another example for generating a spanning tree. This time the root of a spanning tree is vehicle 7 ($N_7$) so the iteration starts from the seventh row. The same steps can be followed as described for FIG. 9A.

Figure 10:
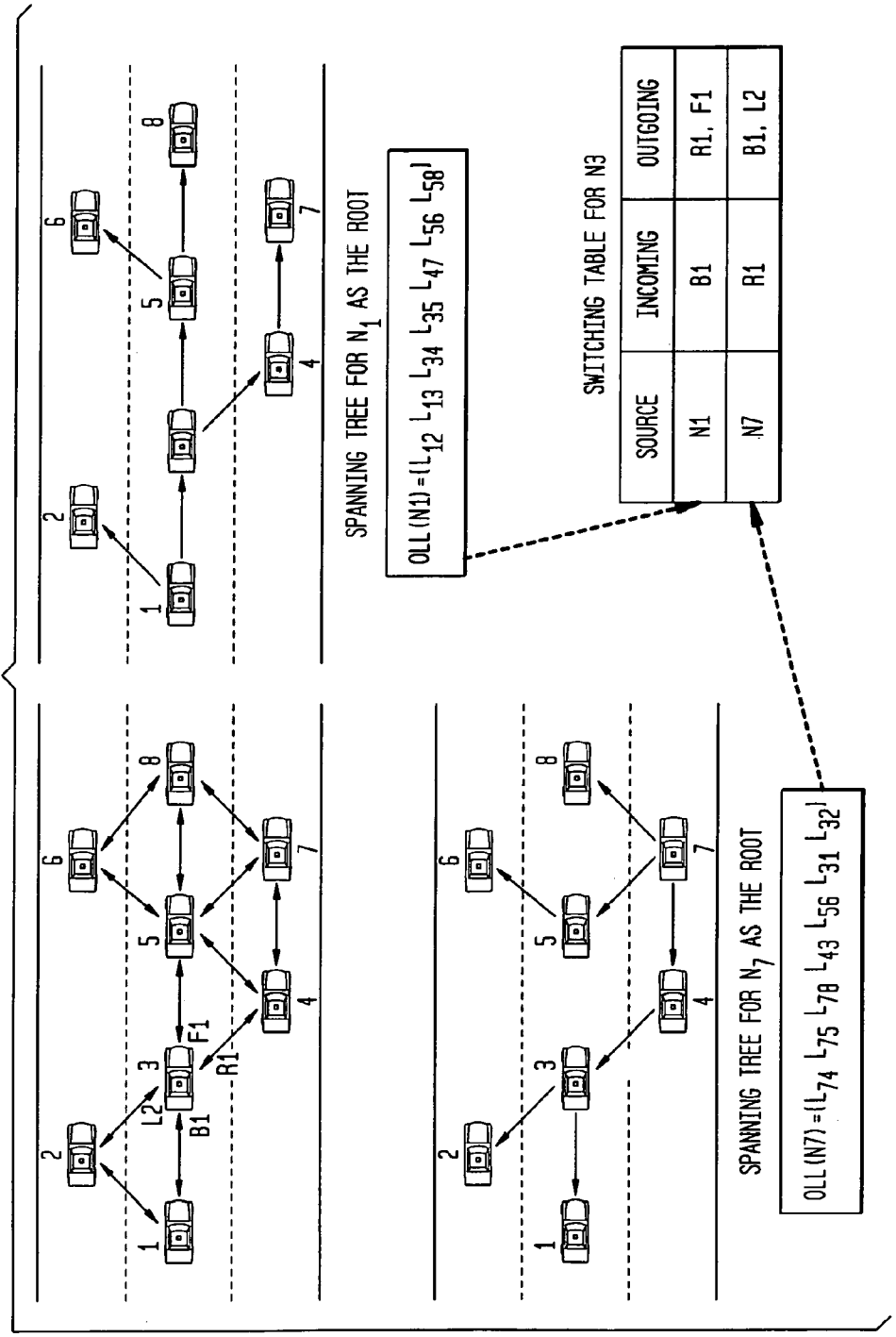
FIG. 10 shows an example for updating switching entries for Switching Table, according to an exemplary embodiment of the present invention.

FIG. 10 shows an example for updating switching entries for Switching Table, according to an exemplary embodiment of the present invention. The Switching Table consists of three fields: Source, Incoming, and Outgoing. Source is the source of a packet, Incoming is an expected incoming interface for a packet, and Outgoing is a list of outgoing interfaces for a packet. Switching Table is updated based on OLLs. From OLL(Ni) which is a spanning tree for Ni as the root, entries for Source, Incoming, and Outgoing are obtained. Take vehicle 3 as an example on the upper left. OLL(N1) for the vehicle contains $\{L_{12}\ L_{13}\ L_{34}\ L_{35}\ L_{47}\ L_{56}\ L_{58}\}$. First the root, $N_1$, becomes the entry for Source. Next pick all the links associated with vehicle 3. Those are $L_{13}\ L_{34}\ L_{35}$. Now divide those links in terms of a origin of link. If a link starts from vehicle 3, that link should be an entry for Outgoing, unless, the link becomes the entry for Incoming $L_{34}$ and $L_{35}$ are the entries for Outgoing and $L_{13}$ is the entry for Incoming. Note that $L_{34}$, $L_{35}$ and $L_{13}$ are corresponding to radio interfaces R1, F1, and B1 respectively for vehicle 3.

Figure 11:
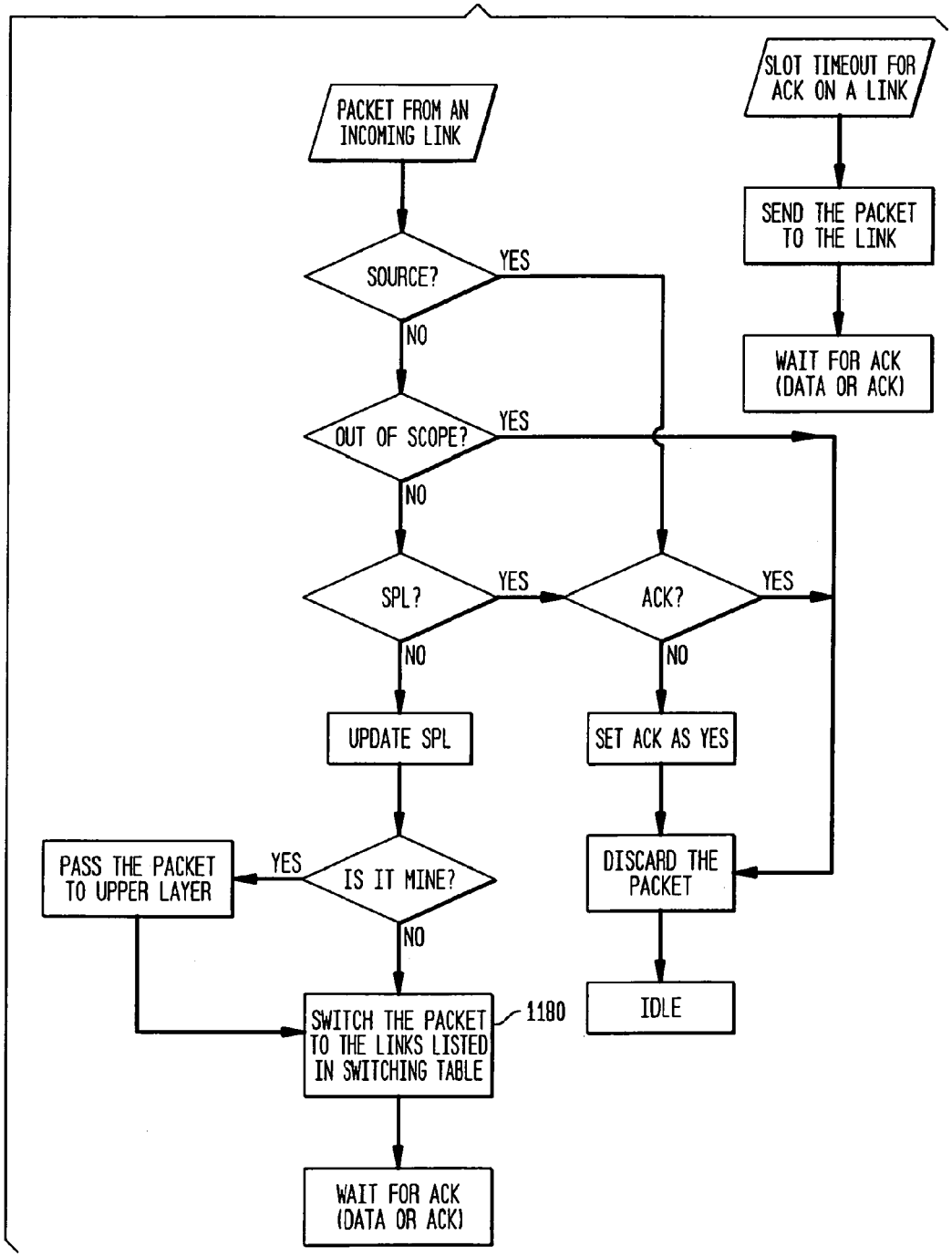
FIG. 11 shows a flow diagram according to the second embodiment of the present invention.

FIG. 11 shows the flow diagram for the second embodiment. The flow is almost identical to the previous embodiment (FIG. 7) with the exception of step 1180, where in the present case, the packet is switched to incoming and outgoing interfaces listed in the Switching Table.

Figure 12:
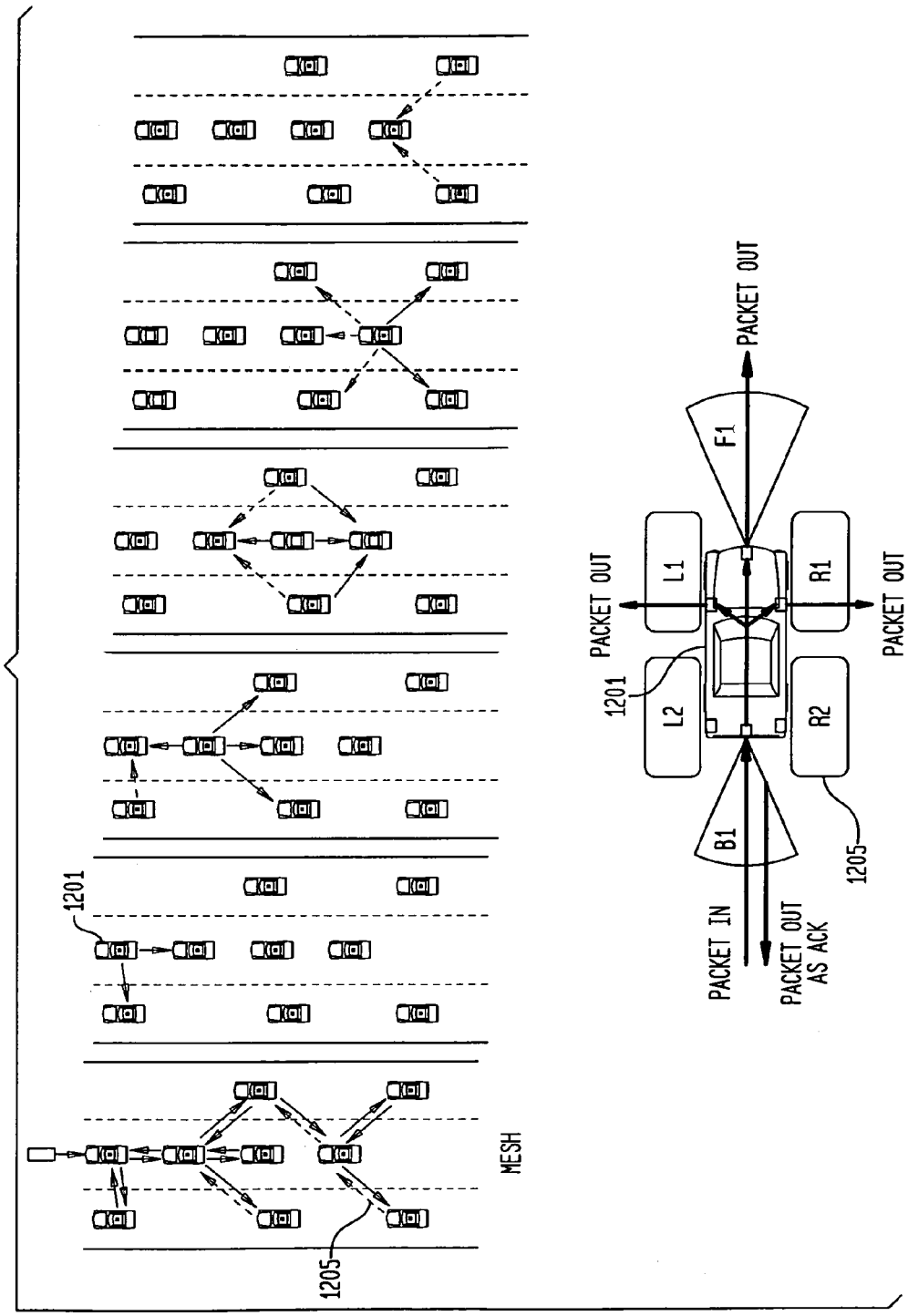
FIG. 12, shows the Two-hop neighborhood embodiment according to a third exemplary embodiment of the present invention.

The third embodiment, described in FIG. 12, shows the Two-hop neighborhood method. In this embodiment, when a vehicle 1201 receives a packet, it forwards the packet to only selective immediate neighbors. This is similar to the second method, but the way of generating Switching Table is different from the second method. Instead of using information about the whole network connectivity that is required for the second method, a vehicle uses information about its immediate neighbors and their immediate neighbors (i.e., two-hop neighbors information). The header, switched packet list (SPL), and acknowledgement method are the same as the previous two embodiments.

This embodiment selects outgoing links from active links using two-hop neighboring information. A vehicle obtains information about two-hop neighbors by collecting information about immediate neighbors from all of its immediate neighbors. When a vehicle contacts an immediate neighboring vehicle first time through a link, they exchange information such as vehicle ID and neighboring information through the link. A vehicle can find the IDs of immediate neighboring vehicles associated with its active links. Since a link connects only two immediate neighboring vehicles, they can indicate the link by each other's ID. In other words, when a vehicle has connected to an immediate neighboring vehicle, it can determine, among its active links, which link connects to that immediate neighboring vehicle.

When a vehicle receives a packet from a link, it can find the sender of the packet (i.e., an immediate neighboring vehicle which replayed the packet) based on information associated with the link. Once it finds the sender of the packet, it finds the immediate neighboring list of the sender from its two-hop neighboring information. Also it gets its own immediate neighboring list. Now it compares its own immediate neighboring list with the sender's immediate neighboring list. In the comparison, it selects its immediate neighboring vehicles that are not listed in the list of the sender's immediate neighboring list. The links associated with those selected immediate neighboring vehicles become the outgoing links for that packet. Accordingly, the number of redundant transmissions which generate duplicate packets is dramatically reduced: When a vehicle receives a packet, it knows which of its immediate neighbors has already received the packet so that it can avoid forwarding the packet to those immediate neighbors with the copy of the packet.

Figure 13:
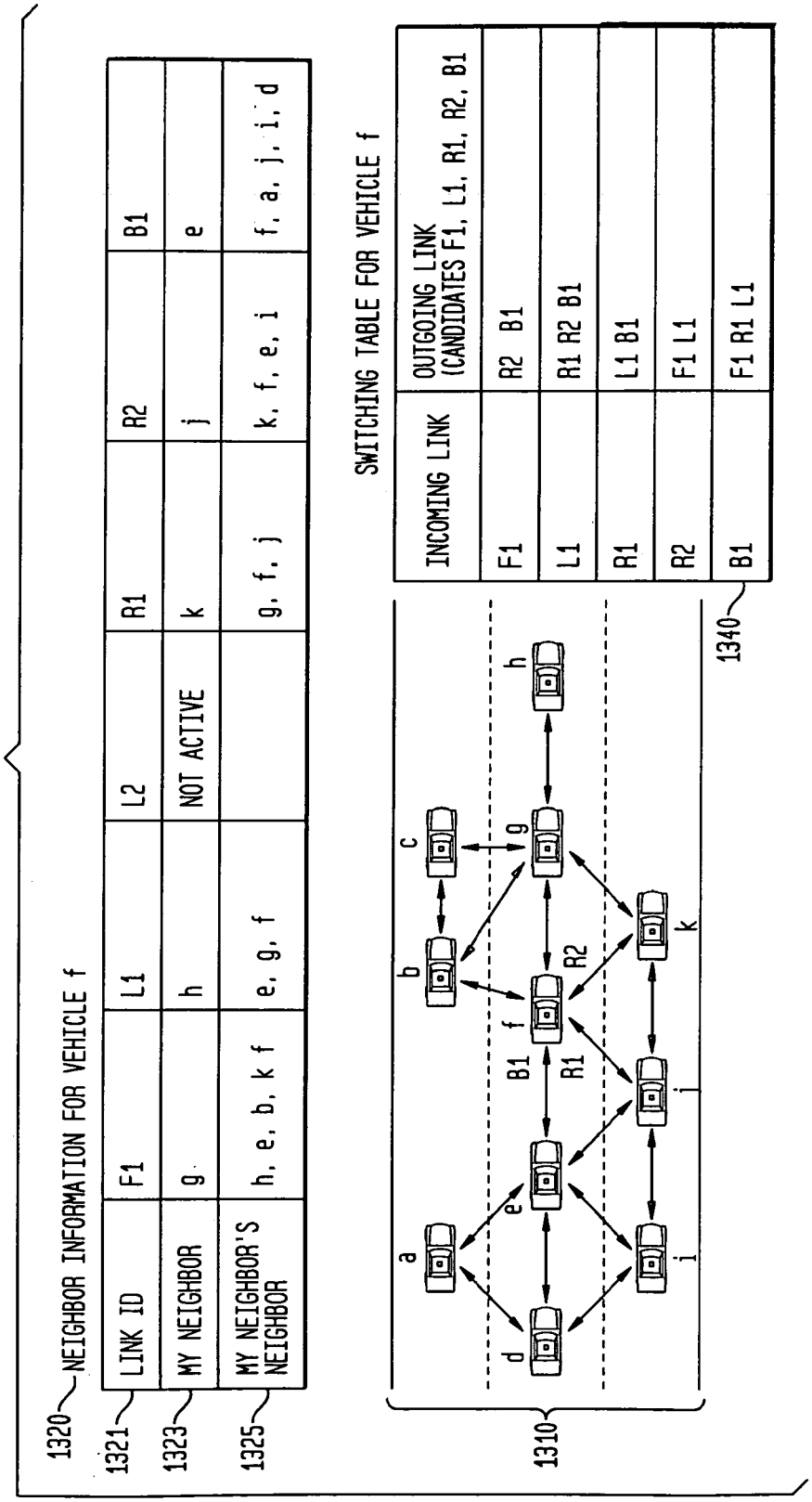
FIG. 13 shows the Neighboring Information Table (NIT) and Switching Table used in a third exemplary embodiment.

FIG. 13 shows the Neighboring Information Table (NIT) 1320 and Switching Table 1340 used in this exemplary embodiment. Every vehicle maintains these two tables. NIT 1320 maintains immediate neighbors in row 1323 and their immediate neighbors in row 1325 for active links in row 1321. Switching Table 1340 contains two fields; Incoming Link and Outgoing Link. Incoming Link is a radio interface associated with a link through which a packet is received, and Outgoing Link is a list of outgoing radio interfaces through which an incoming packet is switched to and sent out. The NIT table 1320 is generated by vehicle f based on the network topology 1310. The vehicle f has 5 active links; F1, L1, R1, R2, and B1. They are associated with the immediate neighboring vehicles g, b, k, j, and e respectively (the neighboring vehicles listed in row 1323 of the NIT 1320). The vehicle g, one of the immediate neighbors of vehicle f, has 5 immediate neighboring vehicles, h, c, b, k, and f (refer to the second column of row 1323 in the Neighbor Information table). According to this information, the second row 1323 of the Switching Table 1340 for vehicle f can be filled: This is a case when vehicle f receives a packet from its immediate neighbor g. The radio interface F1 which is being associated with the immediate neighbor g becomes the entry for Incoming Link. The outgoing radio interfaces are determined based on a comparison between vehicle f's and g's immediate neighbors. Vehicles belonging to vehicle f's immediate neighbors but not belonging to vehicle g's immediate neighbors are selected, which are vehicle j and e, and radio interfaces associated with those selected vehicles become the entries for the Outgoing Link, which are R2 and B1. By repeating these procedures for the rests of the active links for vehicle f, the Switching Table 1340 for vehicle f should be completed.

Figure 14:
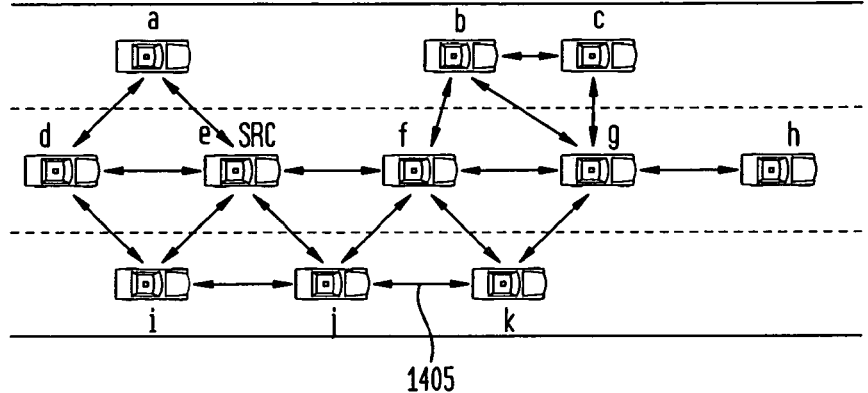
FIG. 14 shows an example of packet dissemination according to an exemplary embodiment of the present invention.
Figure 14:
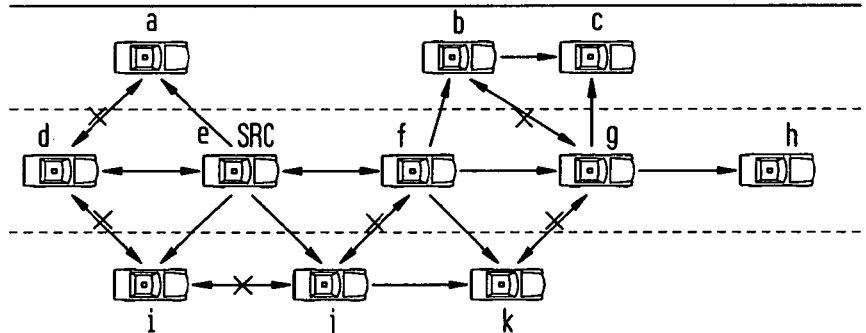

FIG. 14 shows an example of packet dissemination in this method. Vehicle e is the source of the packet and link connectivity among vehicles in the network is represented by arrows 1405. As shown in the bottom half, many links are not used for the packet dissemination but the packet is delivered to all vehicles in the network. Note that a link with X mark is not used for the packet dissemination.

Group Coding

Network coding is used to increase the usefulness of the available capacity in the network. The idea is to mix information at intermediate vehicles rather than simple relaying and replicating. The key notion was proposed in the following paper, which is hereby fully incorporated herein in its entirety.

R. Ahlswede, N. Cai, S.-Y. R. Li, and R. W. Yeung, "Network Information Flow", (IEEE Transactions on Information Theory, IT-46, pp. 1204-1216, 2000).

The present invention leverages the concept of network coding to enhance multi-hop throughput amongst a group of vehicles.

The operations such as addition, multiplications etc are performed in the Galois field (GF). E.g., 1+1=0 in GF(2) The original information is split into n blocks ($b_1, b_2 \ldots b_n$) of k bytes each:

$$x = \sum_{i=1}^{n} c_i b_i$$

A linear combination is taken using coefficients chosen randomly. The resultant size of x is the same as each of the original n blocks. The coefficients used to calculate the coded block are appended with the block for later decoding. At intermediate vehicles, received blocks are coded in a similar fashion and sent. For a stream of data at the source encoding is done continuously. To differentiate between different original coded blocks, a level number is assigned. For e.g., the first n blocks coded are assigned level 1, the second n blocks are assigned level 2 and so on so forth. The level number can be rolled over at an appropriate value. Level numbers are also included in the coded block from a source. Intermediate vehicles, code across different packets received in the same level number. At the receiver, all the packets of a particular level number are used for decoding.

The values of n and k ideally depend on several system variables such as packet size, the network topology (broadcast capacity), number of links etc. Depending on the roadway environment the parameters can be adjusted to provide an appropriate compromise between robustness, delay and throughput. The encoding and decoding can be done in a completely distributed fashion without the knowledge of the network topology. The process is independent of the presence of loops in the network and the direction of data transmission and the vehicle traffic.

At the receiver, the vehicle waits for n blocks to obtain a matrix from the embedded coefficients. Each row of the matrix A, corresponds to coefficients from one block. The original blocks are recovered through an inversion operation using gaussian elimination $[b1, \ldots bn] = A^{-1} x^T$ A progressive decoding methodology is possible without having to wait for all the required blocks using Gauss-Jordan elimination.

The encoding and decoding can be done in a completely distributed fashion without the knowledge of the network topology. The process is independent of the presence of loops in the network and the direction of data transmission and the vehicle traffic.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A vehicular ad-hoc network (VANET), comprising:
a first vehicle having a plurality of antennas;
a first neighbor vehicle that transmits a data packet that is received by said first vehicle via a first antenna out of the plurality of antennas;
a second neighbor vehicle to receive said data packet send by said first vehicle via a second antenna out of the plurality of antennas; and
said first vehicle further comprising a switching unit to transfer the data packet between said first and second antennas;
wherein communication between an antenna of a neighbor vehicle and an antenna out of the plurality of antennas of the first vehicle further comprises at least one directional radio link, and wherein the data packet further comprises metadata including an antenna ID, neighbor vehicle ID, initial location, hop count, sequence number, and application attributes; and
wherein the switching unit generates a Switched Packet List (SPL), said SPL comprising a source ID, sequence number for the data packet, acknowledgement status, and a cached copy of the data packet.

2. The VANET of claim 1, further comprising:
a unit to generate a link table for each antenna of said plurality of antennas on the first vehicle, said link table including records for each neighbor vehicle within communication range of said each antenna, and at least attributes comprising bandwidth and link lifetime for each directional radio link with said each neighbor vehicle.

3. The VANET of claim 2, wherein the link table for each antenna is updated at a frequency that is a function of a relative speed of the first vehicle, and wherein records for neighbor vehicles that are not updated are purged after a set time.

4. The VANET of claim 1, wherein the first vehicle maintains a neighbor table comprising records for each directional radio link, said records including information about each antenna and the vehicle ID of the directional radio link.

5. The VANET of claim 4, wherein the records further comprise at least information pertaining to the link comprising a MAC address and IP address of the antenna and the neighbor vehicle.

6. The VANET of claim 1, wherein the switching unit discards an incoming data packet if a record for said incoming data packet exists in the SPL.

7. The VANET of claim 1, wherein the switching unit discards an incoming data packet if an acknowledgement status for said incoming data packet is affirmative.

8. The VANET of claim 1, further comprising a switching table showing a status of all direct radio links between vehicles in the network, and a spanning tree comprising information on each outgoing link.

9. The VANET of claim 8, wherein the switching table comprises a source field, incoming field, and outgoing field, wherein the incoming and outgoing fields are obtained based on the outgoing links in the corresponding source spanning tree.

10. The VANET of claim 1, wherein the first vehicle forwards the data packet only to selected neighbors.

11. The VANET of claim 10, further comprising a Neighboring Information Table (NIT) comprising neighbors for the first vehicle and associated active links for each neighbor and neighbors for each neighbor.

12. The VANET of claim 11, further comprising a switching table showing status of incoming and outgoing direct radio links between the first vehicle and the plurality of neighbor vehicles, wherein the outgoing radio links are determined based on a comparison of immediate neighbors of the first vehicle and immediate neighbors of the neighbor vehicle.

13. The VANET of claim 1, further comprising:
a group coding manager configured to perform the following operations: splitting the data packet into a plurality of blocks; randomly selecting coefficients from a finite field; taking a linear combination of the blocks with said coefficients; and embedding the coefficients in the data packet to form a coded block;
wherein said coded block is transmitted via a plurality of intermediate vehicles to a destination vehicle whereupon the group coded block is decoded through a matrix inversion operation in a finite field.

* * * * *

UNITED STATES PATENT AND TRADEMARK OFFICE
CERTIFICATE OF CORRECTION

PATENT NO. : 8,570,994 B2  
APPLICATION NO. : 13/276375  
DATED : October 29, 2013  
INVENTOR(S) : Chen et al.

Page 1 of 1

It is certified that error appears in the above-identified patent and that said Letters Patent is hereby corrected as shown below:

On the Title Page, Item (74), under "Attorney, Agent, or Firm", in Column 2, Line 1, delete "Philips J. Feig" and insert -- Philip J. Feig --, therefor.

In the Specification

In Column 9, Line 24, delete "by a link)" and insert -- by a link). --, therefor.

In Column 10, Line 55, delete "node it," and insert -- node u, --, therefor.

In Column 11, Line 24, delete "$N_i$" and insert -- $N_1$ --, therefor.

In Column 11, Line 55, delete "forth" and insert -- fourth --, therefor.

In Column 13, Line 56, delete "GF(2)" and insert -- GF(2). --, therefor.

In Column 14, Line 27, delete "$[bl,....bn] = A^{-1} x^T$" and insert -- $[bl,....bn] = A^{-1} x^T.$ --, therefor.

Signed and Sealed this  
Seventh Day of April, 2015

Michelle K. Lee  
*Director of the United States Patent and Trademark Office*